May 21, 1968  E. KAUER  3,384,773
ELECTRIC INCANDESCENT LAMP WITH LEVITATING INCANDESCENT BODY
Filed March 4, 1965
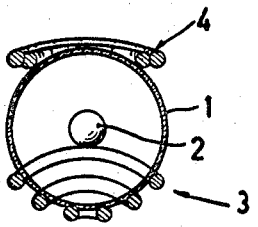
FIG.1
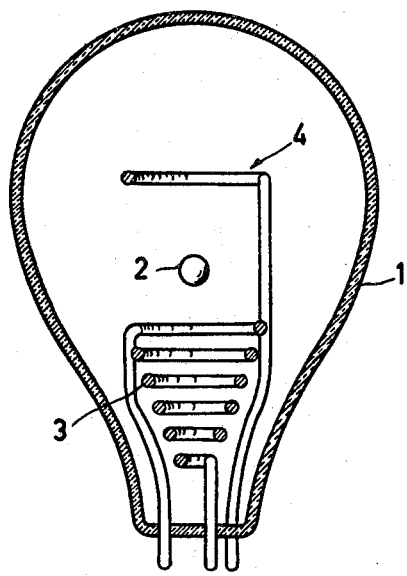
FIG.2
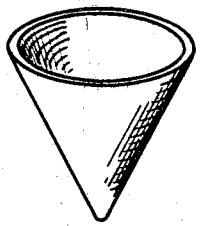  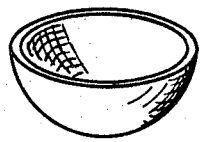
FIG.3a  FIG.3b
INVENTOR.
ERHARD KAUER
BY
AGENT 3,384,773
ELECTRIC INCANDESCENT LAMP WITH
LEVITATING INCANDESCENT BODY
Erhard Kauer, Aachen, Germany, assignor to North
American Philips Company, Inc., New York, N.Y.,
a corporation of Delaware
Filed Mar. 4, 1965, Ser. No. 437,020
Claims priority, application Germany, Mar. 12, 1964,
N 24,613
3 Claims. (Cl. 313—222)

ABSTRACT OF THE DISCLOSURE

Electric incandescent lamp with a high frequency coil for producing levitation in an incandescent body, and additionally having a stabilizing counterturn located in said lamp and on the side opposite to said incandescent body from said coil.

---

This invention relates to gas-filled incandescent lamps having an incandescent body heated by a high-frequency field.

In lamps containing a reactive transport gas, the material evaporating from the incandescent body when the lamp is lit is transported quantatively and continuously back to the incandescent body. A transport gas known for this purpose is iodine. Tungsten incandescent lamps containing, in addition to an inert gas, iodine vapour do not become blackened, as is well-known, if the pressure of the inert gas and the volume of iodine are chosen to be high enough and the wall of the lamp is at a sufficiently high temperature. That the blackening is not forthcoming is a result of the reaction:

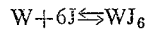

$$W + 6J \rightleftharpoons WJ_6$$

which proceeds to the right at low temperatures and to the left at high temperatures. The cyclic process proceeds quantatively. However, the amount of activation energy for the thermal dissociation of the $WJ_6$ is so small, that it substantially falls to pieces already at temperatures which are considerably lower than the operating temperature of the incandescent body. The transport of the tungsten is thus effected fairly evenly and actual regeneration of the attenuated areas on the incandescent body is not obtained. Consequently lamps filled with iodine have a life which is only inappreciably longer than that of ordinary lamps at the same operating temperature. Degeneration of the incandescent body would require an activation energy which is greater than that of the evaporation of the tungsten. $WF_6$ only has such a high activation energy.

Because of the high thermal stability of fluorine compounds, the transport is preferably effected to the hottest areas on the incandescent body, resulting in a homogeneous geometry and temperature of the incandescent body being adjusted and maintained during the whole life of the lamp. However, another process now becomes determinative of the life of the incandescent body. The tungsten-fluorine cyclic process causes material to be transported from colder areas of the incandescent body to hotter areas until the temperature is perfectively homogeneous throughout the incandescent body. However, the ends of the incandescent body are continuously cooled from the current supply members and hence attacked by fluorine until they eventually burn through close to the current supply members.

Such conditions also prevail to a greater or lesser extent when using chlorine and bromine as a transport gas.

An object of the invention is to provide a lamp in which these disadvantages do not occur.

According to the invention the lamp comprises a bulb containing a reactive transport gas and an electrically conductive body, together with means for bringing the body to a floating condition and heating the body, which means are located externally of the space enclosed by the bulb and filled with gas.

The method of making bodies as such float freely in a molten state (levitation) is known per se. The term "levitation" is to be understood to mean the floating of electrically conductive bodies in a high-frequency field as a result of Lorentz forces. The levitation is used, for example, for melting bodies with no crucibles. However, according to the invention, a lamp on this principle which is usable in practice will be obtained only when using simultaneously cyclic processes. It is only then that this method will show to full advantage. The incandescent body not being locally cooled by current supply members and the like, it is possible to use successfully as reactive transport gases such as iodine, bromine, chlorine, fluorine and also mixtures of these gases. Other transport gases or their mixtures can also be used. Furthermore inert gases may be present. The pressure may be very low or be made equal to or higher than atmospheric pressure.

The electrically conductive body consists, for example, of a metal having a low vapour pressure such as tungsten.

The bulb may be made of glass, quartz, $Al_2O_3$ or other materials preferably having a melting or softening point higher than 1,000° C. The dimensions and shape of the bulb are such that, during operation, the bulb wall assumes a temperature which is high enough for maintaining the cyclic process.

In order that the invention may be readily carried into effect, it will now be described in detail, by way of example, with reference to the accompanying diagrammatic drawing, in which:

FIGURES 1 and 2 show sections of a lamp according to the invention. The lamp fundamentally comprises a bulb 1 containing a floating body 2. It also includes means for bringing the body 2 into a floating condition and heating it. These means are preferably combined into a coil 3 for the sake of simplicity.

FIGURE 1 shows a funnel-shaped coil. Such a construction is preferable since it permits maximum concentration and increase in gradient of the alternating magnetic field produced by the coil on passing a high-frequency current through it.

The floating body with the eddy-currents produced in it by the alternating magnetic field may be regarded as a magnetic dipole which is subject in the alternating field to an action of force which is proportional to the product $H \times grad. H$=amplitude of the vector of the alternating magnetic field.

The direction of the lifting forces (negative polarity: repulsion) appears from the conditions for the Lorentz force ("threefinger rule of the left hand").

According to this rule the force vector is at right angles to the vector of the magnetic field and the current vector. Because of the skin effect in the peripheral layer of the floating body, the last-mentioned vector may be assumed to be equal to the eddy-current paths produced. If from the force vectors applying to the rotation-symmetrical floating body, each time the force vectors which face each other are drawn up in a pairwise manner according to the parallelogram of forces into one resultant vector, then a force vector results which is parallel to the axis of the coil producing the alternating magnetic field and directed away therefrom. In order to increase the strength (H) of the magnetic field or of its gradient, it is possible to increase the number of turns and keep their radius as small as possible. Both conditions, concentration of the lines of the field and increase in the gradient of the field, are met most advantageously by a funnel-shaped method of winding the coil 3.

Stability of the position, that is to say more particularly an immobile position of the floating body in the magnetic field, is obtainable with the funnel-shaped coil 3. If desired, it is possible to arrange over the floating body a counter winding 4 having a stabilizing action. However, the lifting force is thus attenuated slightly. The said counter winding is, for example, of a helical shape and its plane of winding is at right angles to the axis of the coil 3.

FIGURE 2 shows an embodiment of the lamp in which the coils 3 and 4 are arranged inside the bulb 1. According to the invention, an arrangement of the coils 3 and 4 externally of the gas-filled space enclosed by the bulb 1 is regarded to be equivalent to the embodiment in which the coils for bringing the body 2 in a floating condition and if necessary, for stabilizing it, although being arranged within the bulb 1, are protected against attack by the reactive transport gas by being enveloped with quartz, $Al_2O_3$, $MgF_2$ or the like, such as was done in the present embodiment.

Solid floating bodies, due to an existing unbalance, sometimes tend to move back and forth or rotate in the magnetic field, these movements sometimes becoming more and more violent until the bodies either fall out of the field or impact against the coil turns of the bulb wall.

A more stable condition may be obtained by giving the floating bodies a conical or semiconical shape, preferably the shape of bodies turned out internally and having an axis of rotation, as shown in perspective in FIGURES 3a and 3b. Such bodies turned out internally afford the advantage of being considerably lighter in weight as compared with solid bodies of the same shape and composition while being subjected to lifting forces of approximately equal value. (Because of skin effect the bodies turned out internally have comparable main eddy-current paths.) Also their radiating surfaces are of a comparable size.

Since the unbalance of the incandescent body when the lamp is lit is caused by the cyclic process, one embodiment of the lamp in which, during operation, the body is present in the molten state affords certain advantages. Since the shape of the molten body is determined only by the surface tension and the electromagnetic and gravity forces applying thereto, the shape would not change in the dynamic equilibrium of the cyclic process, irrespectively of the areas on the incandescent body from which the material is preferably evaporated or deposited thereon. In fact, for molten incandescent bodies, it is completely irrelevant where the transported material is deposited. The molten body will invariably assume a shape which is determined by the combined action of Lorentz forces, gravity and surface tension. The incandescent body is therefore no longer a measure of the life of the lamp.

However, this lamp has another interesting aspect. In the ordinary tungsten lamp the losses due to evaporation determine the operating temperature. By using the processes known per se it is believed that temperatures up to near the melting point can be obtained. The lamp according to the invention, however, allows of temperatures which, under certain conditions, far exceed the melting temperature if the regenerative transport reaction proceeds rapidly enough.

Since, for example, the luminous density is a function of temperature, such a lamp having an incadescent body which is fluid during operation will in this respect be superior to any incandescent lamp hitherto known.

*Example*

Small balls of copper, tungsten and graphite of approximately 8 mms. in diameter were brought in a floating condition in a device as shown in FIGURE 2 comprising a coil 3 (6 turns) and a stabilizing counterturn 4. The temperatures obtained were in all cases approximately 2,500° K. and were determined substantially by the limited capacity of the high-frequency transmitter employed. Typical operating values for the above-mentioned conditions are, for example: frequency 820 kc./s. (coil current 170 amps.), voltage of the coil 220 volts. Copper was melted under these conditions.

What is claimed is:

1. A gas filled incandescent lamp comprising a closed envelope provided with an incandescent body, a coil for creating a high frequency field and for heating and bringing the incandescent body into a floating state, and a counterturn located at the opposite side of said incandescent body from said coil, said counterturn providing a stabilizing action and having its plane of winding at right angles to the longitudinal axis of said coil said closed envelope having an atmosphere which when the lamp is operative reacts with evaporated body material to form a compound that dissociates in the vicinity of said incandescent body.

2. A gas filled incandescent lamp as claimed in claim 1 wherein said incandescent body is hollowed out and in a conical shape.

3. A gas filled incandescent lamp as claimed in claim 1 wherein said incandescent body is hollowed out and in a hemispherical shape.

References Cited

UNITED STATES PATENTS

| | | | |
|---|---|---|---|
| 2,171,359 | 8/1939 | Gestler | 313—161 X |
| 2,686,864 | 8/1954 | Wroughton et al. | 219—7.5 |

JAMES W. LAWRENCE, *Primary Examiner.*

S. A. SCHNEEBERGER, *Assistant Examiner.*